United States Patent
Sato et al.

[11] Patent Number: 6,157,501
[45] Date of Patent: Dec. 5, 2000

[54] LENS HOLDING STRUCTURE

[75] Inventors: Mitsuhiro Sato, Hachioji; Tamotsu Koiwai, Akiruno; Kazuyuki Iwasa, Hino, all of Japan

[73] Assignee: Olympus Optical Co., Ltd., Tokyo, Japan

[21] Appl. No.: 09/324,195

[22] Filed: Jun. 2, 1999

[30]     Foreign Application Priority Data

Jun. 8, 1998  [JP]  Japan .................................. 10-159239

[51] Int. Cl.⁷ .................................................. G02B 7/02
[52] U.S. Cl. ........................................... 359/819; 359/811
[58] Field of Search ..................... 359/811, 819

[56]            References Cited

U.S. PATENT DOCUMENTS

| | | | |
|---|---|---|---|
| 803,794 | 11/1905 | Starbuck ................................... | 33/507 |
| 2,141,317 | 12/1938 | Sabel ......................................... | 88/57 |
| 2,258,223 | 10/1941 | Sachtleben ................................ | 88/57 |
| 2,528,712 | 11/1950 | Sachtleben ................................ | 88/57 |
| 2,600,975 | 6/1952 | Critoph ..................................... | 88/57 |
| 5,220,460 | 6/1993 | Bedzyk ..................................... | 359/813 |
| 5,680,260 | 10/1997 | Farcella et al. .......................... | 359/819 |
| 5,748,390 | 5/1998 | Koiwai et al. ........................... | 359/811 |

FOREIGN PATENT DOCUMENTS

| | | |
|---|---|---|
| 5-11116 | 2/1993 | Japan . |
| 9-197237 | 7/1997 | Japan . |

*Primary Examiner*—Scott J. Sugarman
*Assistant Examiner*—David N. Spector
*Attorney, Agent, or Firm*—Frishauf, Holtz, Goodman, Langer & Chick, P.C.

[57]            ABSTRACT

A lens holding structure is incorporated in an optical system, such as the photographing optical system of a camera. The lens holding structure has a holding member (i.e., a lens frame) for holding a non-circular lens included among the lenses of the photographing optical system. The non-circular lens has an arcuate outline portion and a linear portion. The holding member holds the non-circular lens by supporting it at at least three points on the arcuate outline portion without touching the linear portion of the lens. The lens holding structure is simple and enables easy and accurate assembly of the optical system of the camera.

26 Claims, 4 Drawing Sheets

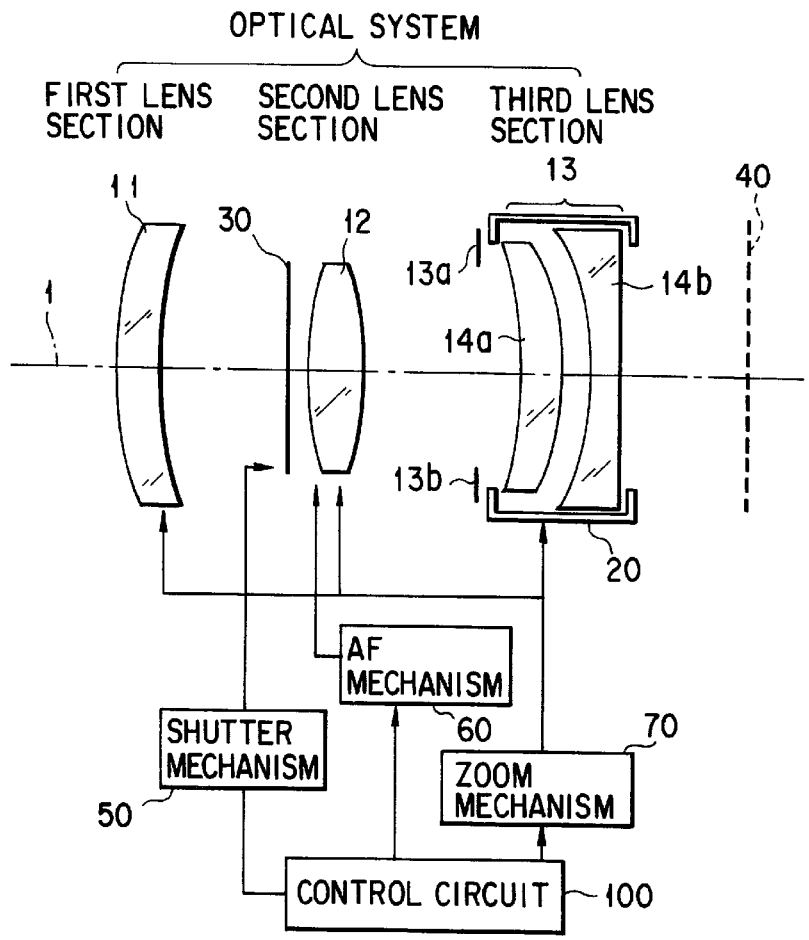
FIG. 1
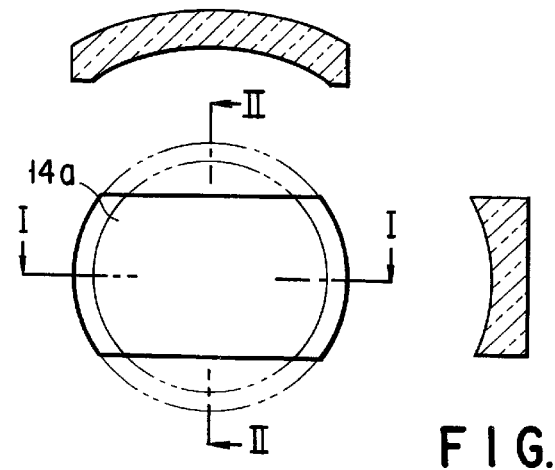
FIG. 2C
FIG. 2B
FIG. 2A

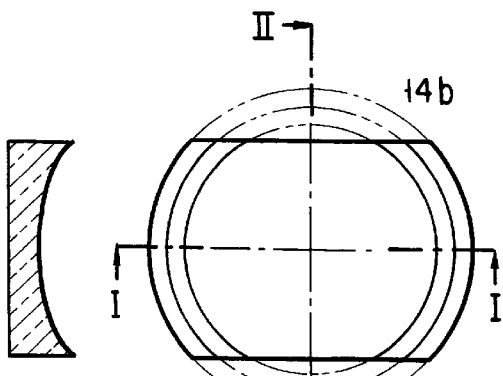
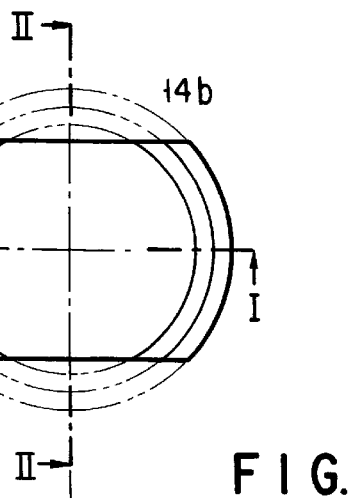
FIG. 3B
FIG. 3A
FIG. 3C
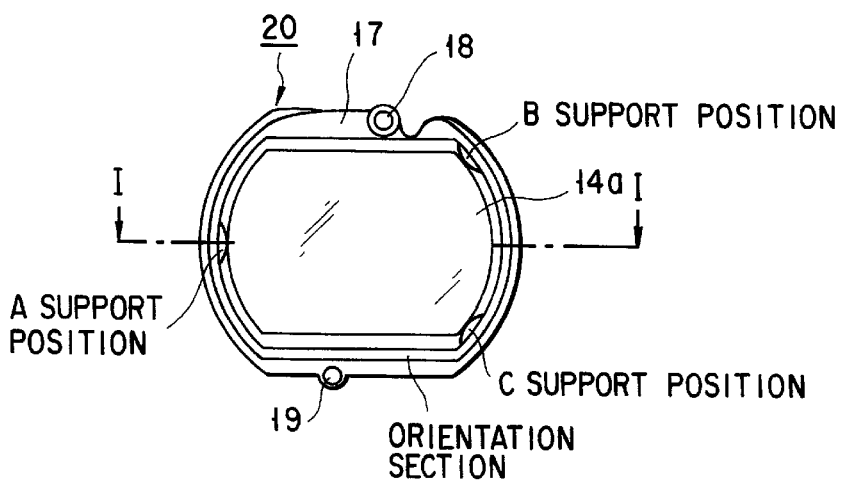
FIG. 4A
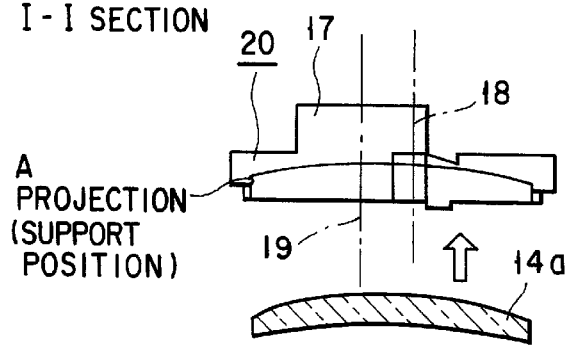
FIG. 4B

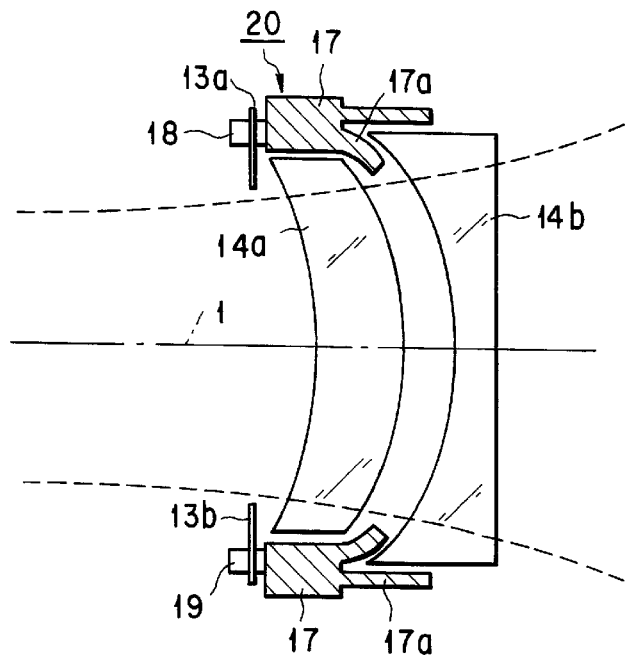
FIG. 5A
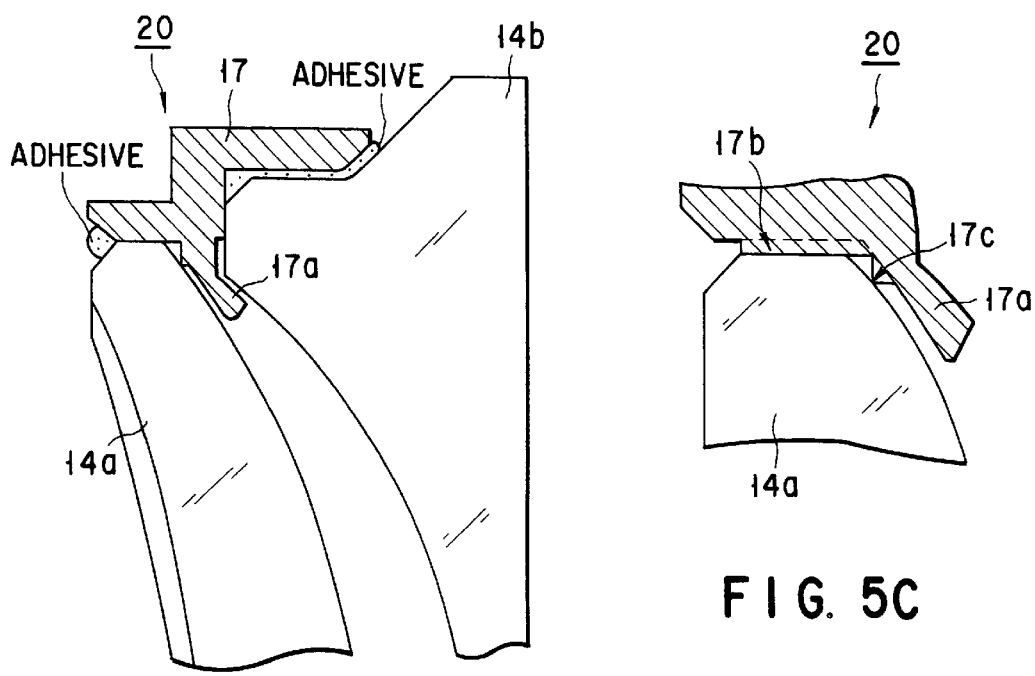
FIG. 5B
FIG. 5C

LENS HOLDING STRUCTURE

BACKGROUND OF THE INVENTION

The present invention relates to a photographing optical system employing a non-circular lens.

Many photographing optical systems of an ordinary type use circular lenses. In the case of a miniature camera, however, the lenses are required to be as small as possible and as light in weight as possible. To satisfy these requirements, circular lenses are worked or ground to remove the portions other than the effective area portions. In the case of lenses which are to be incorporated in the photographing optical system of a camera, they can be formed as substantially rectangular since the frames of film which are to be exposed to light are rectangular.

Jpn. UM Application KOKAI Publication No. 05-11116 and Jpn. Pat. Application KOKAI No. 09-197237 disclose a lens barrel and a photographing lens system, respectively, and the lenses described in them are non-circular lenses obtained by cutting off part of circular lenses.

In the lens barrel disclosed in Jpn. UM Application KOKAI Publication No. 05-11116, a first lens section includes a non-circular lens which is obtained by cutting off the upper and lower portions of a circular lens, and the use of such a non-circular lens contributes to a decrease in the size of the lens barrel. The publication, however, does not provide a detailed description as to how the lens should be held, nor does it provide any suggestions on the holding method.

Jpn. Pat. Application KOKAI No. 09-197237, which is directed to improvements of the prior art described above, proposes a technique for reducing the number of structural components required and making efficient use of the space. According to this reference, the optical system is adjusted first and then a predetermined holding member is secured to the optical system. The invention of the reference, however, has a disadvantage that the adjustment of the lenses of the optical system is inevitably complicated. In addition, the non-circular lens usually cannot be worked with high precision at the non-arcuate outline portions, and cannot be easily held with high accuracy.

Accordingly, an object of the present invention is to propose a lens holding structure which is employed in a photographing optical system to hold a non-circular lens having an arcuate outline portion, and which is simple in structure and provided with a lens frame or the like.

BRIEF SUMMARY OF THE INVENTION

To provide a solution to the problems of the prior art and achieve the object described above, the present invention proposes a lens holding structure comprising a holding member for holding a non-circular lens with arcuate and non-arcuate outline portions by supporting the lens at the arcuate outline portion only, without the non-arcuate outline portion being touched.

The present invention also proposes a lens holding structure comprising a holding member for holding a non-circular lens with arcuate and non-arcuate outline portions by supporting the lens at at least three positions of the arcuate outline portion, without the non-arcuate outline portion being touched.

The present invention further proposes a lens holding structure for holding a non-circular lens having a plurality of non-arcuate outline portions, which are obtained by cutting off the outer circumference of a circular lens at some positions away from the optical axis of the circular lens by a predetermined distance, and a plurality of arcuate outline portions, which are portions other than the non-arcuate outline portions, the lens holding structure comprising a holding member having projections on an inner circumferential surface thereof, the projections corresponding to two positions located near two ends of one of the arcuate outline portions and to a position which is symmetric to the middle point between the two positions and on the arc of the arcuate outline portion with reference to the optical axis.

The present invention also proposes a lens holding structure for holding a non-circular lens having a non-arcuate outline portion, which is obtained by cutting off the outer circumference of a circular lens at a position away from the optical axis of the circular lens by a predetermined distance, and an arcuate outline portion, which is a portion other than the non-arcuate outline portion, the lens holding structure comprising a holding member having projections on an inner circumferential surface thereof, the projections corresponding to two positions located near two ends of the arcuate outline portion and to a position which is located near the middle point between the two positions and on the arc of the arcuate outline portion.

The present invention also proposes a photographing optical system which is designed for guiding an optical image onto a film and which comprises a plurality of non-circular lenses each having a plurality of arcuate outline portions and a plurality of non-arcuate outline portions, and a holding member for holding at least one of the non-circular lenses at at least three positions, the three positions being two positions located near two ends of one of the arcuate outline portions and one position which is located near the middle point of the arcuate outline portion opposite to the arcuate outline portion including the two positions.

The present invention also proposes a photographing optical system which is designed for guiding an optical image onto a film and which comprises a plurality of non-circular lenses each having an arcuate outline portion and a non-arcuate outline portion, and a holding member for holding at least one of the non-circular lenses at at least three positions, the three positions being two positions located near two ends of the arcuate outline portion and one position which is located near the middle point of the arcuate outline portion including the two positions.

Additional objects and advantages of the invention will be set forth in the description which follows, and in part will be obvious from the description, or may be learned by practice of the invention. The objects and advantages if the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a camera comprising an optical system that employs oval lenses.

FIGS. 2A–2C are views of a convex lens, FIG. 2A being a plan view, FIG. 2B being a horizontal side view, and FIG. 2C being a vertical side view.

FIGS. 3A–3C are views of a concave lens, FIG. 3A being a plan view, FIG. 3B being a horizontal side view, and FIG. 3C being a vertical side view.

FIGS. 4A and 4B show a lens frame that characterizes the present invention, FIG. 4A being a front view illustrating the lens frame and a lens held in the lens frame, and FIG. 4B being a horizontal sectional view of the lens frame.

FIGS. 5A–5C show how a lens is held by the lens frame, FIG. 5A being a vertical sectional view showing the positional relationships between the lens frame and the lens, FIG. 5B being a horizontal sectional view showing part of the lens frame, and FIG. 5C being a horizontal sectional showing an end portion of the lens frame in an enlarged scale.

DETAILED DESCRIPTION OF THE INVENTION

Figure 6A:
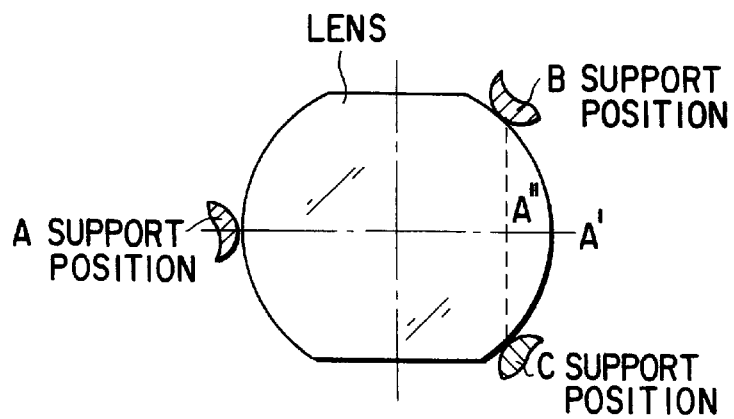
FIGS. 6A–6C show manners in which a lens is supported at three positions, FIG. 6A being an explanatory illustration showing a manner in which an oval lens is supported at three positions, FIG. 6B being an explanatory illustration showing a modified manner in which the lens is supported, and FIG. 6C being an explanatory illustration showing a manner in which a "D"-shaped lens is supported at three positions.

FIG. 1 is a conceptual diagram showing the optical system of a miniature camera, along with the related mechanism and the controller. Referring to FIG. 1, an optical system 10 is arranged ahead of a film 40. The optical system 10 is made up of a first lens section 11, a second lens section 12 and a third lens section 13 which includes two lenses, and these lens sections are along an optical axis 1, with the first, second and third lens sections being located at the forward, intermediate, and rearward positions, respectively.

A shutter 30 is arranged between the first lens section 11 and the second lens section 12. The shutter 30 is connected to a control circuit 100 by way of a shutter mechanism 50. The second lens section 12 is connected to an AF (Auto Focus) mechanism 60, and is moved in the direction of the optical axis in accordance with an instruction from the control circuit 100, for a focusing operation. The first lens section 11, second lens section 12 and third lens section 13 are connected to a zoom mechanism 70, and are driven for zooming an image at a desired magnification. The shutter mechanism 50, the AF mechanism 60 and the zoom mechanism 70 are connected to, and controlled by the control circuit 100, which operates on the basis of a program for controlling the entire camera.

Each of the lenses 14a and 14b of the third lens section 13 in the optical lens system 10 is a non-circular "cut lens." This non-circular lens is obtained by cutting off the upper and lower portions of a circular lens in such a manner that the cut lines are parallel to each other. The lenses 14a and 14b are held at the predetermined positions of a lens frame 20, and the resultant one-body structure is secured to a lens barrel (not shown).

In the optical system 10 made up of three lens sections, the lens section that is nearest to the film surface includes a non-circular cut lenses. On the front side of that lens section, masks 13a and 13b are arranged in the vicinity of the periphery so as to prevent flare which may be produced at the cut portions of the lens.

Inside the lens barrel, the first, second and third lens sections 11–13 are arranged at predetermined intervals. The attachment frame member for holding the lenses 14a and 14b is provided with the lens frame 20 described above, and the structure of this lens frame 20 is based on the shape and structure of the lenses.

The shapes of the lenses to be employed are as follows. Of the lenses used in the optical system, those which are located close to an object to be photographed have a circular shape or a shape close to it, while those who are located away from the object have a non-circular shape, to be more specific, an oval shape. The oval lens is obtained by cutting off the upper and lower portions of a circular lens in such a manner that the cut lines are parallel to each other, and the use of such an oval lens is effective in reducing the size and weight of the optical system and making efficient use of the space available. (For simplicity, the term "oval lens" will be used hereinafter, but this term is intended to cover all types of non-circular lenses, including a lens defined by linear and arcuate outlines.) In place of the oval lens, a "D"-shaped cut lens may be employed. The "D"-shaped cut lens is obtained by cutting off a circular lens on one side and will be hereinafter referred to simply as a "D"-shaped lens."

The lens frame 20 adapted to hold oval lenses (non-circular lenses) is featured by supporting each oval lens at three positions on arcuate outlines.

To be more specific, an oval lens (one type of a non-circular lens) has two arcuate outlines, and is held by supporting three positions on the outlines. A holding member with which to support the oval lens is arranged at three positions, two of which are substantially at the respective ends of one of the arcuate outlines, and the last one of which is near the center of the other arcuate outline.

The oval convex lens 14a and the oval concave lens 14b are shown in detail in FIGS. 2A and 3A, respectively. FIGS. 2B and 3B show vertical sections taken along lines II—II of FIGS. 2A and 3A, and FIGS. 2C and 3C show horizontal sections take along lines I—I of FIGS. 2A and 3A.

As can be seen from FIGS. 2A–2C and 3A–3C, the oval convex lens 14a and oval concave lens 14b are lenses obtained by cutting off the upper and lower portions of circular lenses in such a manner that the cut lines are parallel to each other and only the effective area portions having desired optical characteristics are left after cutting. Each of the lenses 14a and 14b is made up of arcuate outline portions (i.e., portions which are not cut off) and straight-outline portions (i.e., portions which are left after cutting). The amounts in which the upper and lower portions of the original circular lenses are cut off are determined in accordance with the performance or characteristics of the camera system and the spatial restrictions at the time of design. In other words, the amounts of the cutoff portions are not necessarily constant in all cases.

When the oval lenses are held, they should be supported not at the straight-outline portions but at the arcuate outline portions, i.e., the portions which are located away from the effective-area portions. (This will be described in detail later with reference to FIGS. 6A–6C.)

The third lens section 13 includes the convex and concave lenses 14a and 14b described above. Of these two lenses, the convex lens 14a is held inside the lens frame 20, with the right and left side portions supported, and the upper and lower portions of the convex lens 14a are not in contact with the lens fame 20. The concave lens 14b, on the other hand, is held inside the lens frame 20 in such a manner that the optical axes of lenses 14a and 14b coincide with each other. The lenses 14a and 14b are slightly isolated from each other.

Inside the lens frame 20, each of the lenses 14a and 14b is in contact with three projections (not shown in FIGS. 2A–2C and FIGS. 3A–3C) slightly protruded from the inner wall of the lens frame 20. By means of the three projections, each lens is positioned and held, as will be described in detail later.

To reliably hold the lenses, an adhesive, such as a thermosetting resin, a resin which sets upon irradiation of ultraviolet rays, or the like, may be used. In this case, no space is provided above or under each lens.

FIG. 4A shows the lens frame 20 and the lens 14a held inside the lens frame 20. The lens frame 20 has a shape similar to the planar shape of the lens 14a, and can be secured inside the lens barrel of a camera (not shown). The lens frame 20 is provided with a concave-side peripheral member 17 which defines an opening slightly smaller than the lens 14a. The concave-side peripheral member 17 has three projections A, B and C which are slightly projected radially inward and which support a lens.

The lens 14a is in contact with the lens frame 20 at positions corresponding to the projections A, B and C. In other words, the lens is positioned and held inside the lens frame by means of the three projections.

Bosses 18 and 19, attached to a mask (not shown) that covers the peripheral portion of the lens, are provided for the upper and lower portions of the lens frame 20. The bosses 18 and 19 penetrate the respective portions of the lens frame 20 and extend in parallel to each other. They are secured by use of an adhesive (not shown).

In the state shown in FIG. 4A, the oval lens is supported at three positions. The three positions are specifically positions B and C which are located near respective ends of one arcuate outline portion and position A which is located substantially at the center of the other arcuate-output portion. The oval lens is supported at these three positions A, B and C only, and the upper and lower straight-outline portions of the lens are not in contact with the lens frame 20.

The positional relationships among the three support positions varies, depending upon the amounts in which the upper and lower portions of the original circular lens are cut off. In the case where the upper and lower portions are cut off in equal amounts, two support positions B and C are located near the respective ends of one arcuate outline portion, and one support position A is symmetric to the middle point of that arcuate outline portion with respect to the optical axis.

When a non-circular lens, such as the oval lens described above, is held in the holding member, the orientation of the lens must be determined. The lens frame 20 has an orientation section for coarsely determining the orientation of the lens, as shown in FIG. 4A.

FIG. 4B shows a horizontal section of the lens frame 20 and illustrates how the lens frame 20 and the lens 14a are before this lens is moved in the direction indicated by the arrow and fitted in the concave section of the lens frame 20. Projection A, which is located substantially in the center of one arcuate outline portion, is shown as being hemispherical in FIG. 4B. It should be noted, however, that the hemisphere in FIG. 4B is an exaggerated illustration, and the actual projection is as low as approximately 5/100 mm.

Although not shown in FIGS. 4A and 4B, lens 14b is held by the lens frame 20 in a similar manner to that of lens 14a. That is, lens 14b is supported by three projections and arranged on the rear side of lens 14a.

In the sectional view in FIG. 5A, the positional relationships among the lenses 14a and 14b and the frame piece 17 of the lens frame 20 are illustrated. Specifically, the sectional view illustrates how the frame piece 17 holds the lenses 4a and 14b after the fabrication of the lens frame 20 is completed.

In view of the three support positions described above (the positions cannot be illustrated in FIG. 5A), it can be understood that the lenses 14a and 14b do not touch the frame piece 17 of the lens frame 20 in the vertical direction perpendicular to the optical axis (i.e., the radial direction of the lenses).

The lenses 14a and 14b do not touch the lens frame 20 in the optical axis direction, either. In the held state, the lenses 14a and 14b are isolated from each other, with a narrow gap of about 0.1 mm defined therebetween.

As can be seen from the above, the lenses 14a and 14b are held by the lens frame 20 only at the three projections described above. In addition, the masks 13a and 13b covering the cut portions of the lens 14a are located at the periphery of the optical path and serve to shield the light.

FIG. 5B shows a horizontal section of the lens frame 20 and the lenses 14a and 14b, and illustrates how the lenses are held by the lens frame 20. In FIG. 5B, the upper portion of the lens frame 20 is depicted, along with the frame piece 17.

FIG. 5C is an enlarged view showing a projection formed on the lens frame 20. As can be seen from FIG. 5C, the lens frame 20 has a horizontal section conforming with the shapes of the lenses 14a and 14b. To be more specific, the lens frame 20 has a projection 17b on the inner peripheral surface of the front portion thereof. The projection 17b is shaped like a triangle pole and extends in the optical axis direction. Since this projection 17b is in linear contact with the arcuate outline portion, the lens 14a immovably held against a force applied to the lens in the radial direction.

The lens frame 20 also has a projection 17c. This projection is provided for portion 17a of the frame piece 17. The projection 17c is shaped like a triangle pole and extends in the horizontal direction. Since this projection 17c is in linear contact with the convex surface of the lens 14a, the lens 14a is immovably held against a force applied thereto in the optical axis direction.

Of the two projections 17b and 17c, projection 17b serves to immovably hold the lens 14a against a force applied to the lens 14a in the radial direction, and projection 17c serves to immovably hold the lens 14a against a force applied to the lens 14a in the optical axis direction. The other side of the lens 14a may also be immovably held against forces applied to the lens in the radial direction and optical axis direction. In other words, the lens 14a can be positioned when it is supported at at least three positions.

The lens 14b located on the rear side of the lens 14a is held in a similar manner. That is, the lens 14b is held by means of a projection shaped like a triangle pole and extending in the vertical direction. The projection is in linear contact with the peripheral portion of the front surface of the lens 14b.

As described above, the lenses 14a and 14b are held at the arcuate outline portions by "point contact", "linear contact", or a combination of these. In the case of "linear contact", the lens surface supported by the "linear contact" is very stable, as in the case where it is supported by two or more positions.

In the case where the lens is made of glass, it has a very small modulus of elasticity and a small coefficient of friction. Hence, the lens frame for supporting the lens at at least three positions is formed of a plastic material that provides sufficient friction and thus enables a stable holding operation. Alternatively, the projections of the lens frame are worked in such a manner as to enable the stable holding operation. The lens can be held in a very stable manner by selecting a suitable material for the lens frame and suitably working the projections. The surfaces of the projections may be roughened to provide a greater coefficient of friction.

To fixedly maintain the held state of the lenses, an adhesive may be used in the manner shown in FIG. 5B.

When the lens frame 20 holds the lens 14a and 14b in the manner shown in FIG. 5B, an adhesive may be introduced into the gap of 0.1 mm or so between the lens frame and the lens 14b and to the region between an end of the lens 14a and the peripheral portion of the lens 14a. The adhesive 20 serves to hold the frame and the lenses 14a and 14b as one body. It should be noted that the amount of adhesive used is a minimum required. Owing to the use of the adhesive, the lens 20 holds the lenses 14a and 14b at the three positions in a very stable manner.

The possible manners in which a lens is supported at three positions will be described, referring to FIGS. 6A–6C. FIG. 6A shows an example of a manner in which an oval lens is held. In the example shown in FIG. 6A, the upper and lower cut lines are parallel to each other, and the amounts in which the upper and lower portions are cut off are slightly different. In this case, two of the holding positions (namely, positions B and C) are located close to the respective ends of one of two arcuate outline portions, and the remaining holding position (namely, position A) is symmetric to the middle point A' of that arcuate outline portion with reference to the optical axis. The case shown in FIG. 5A is an example in which the distance between holding positions B and C is longest.

Figure 6B:
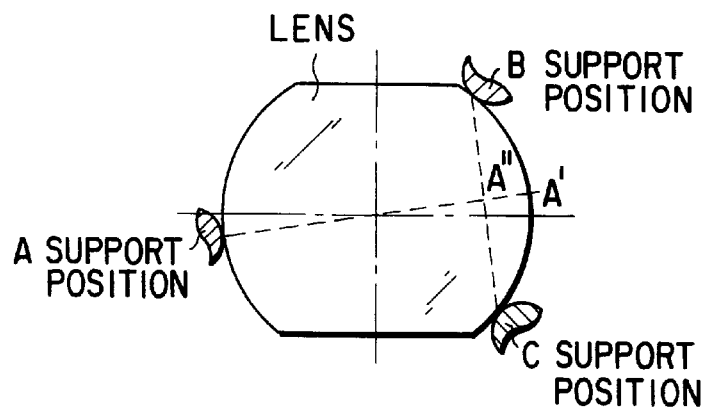

FIG. 6B shows another example of a manner in which an oval lens is held. In the example shown in FIG. 6B, two of the holding positions (namely, positions B and C) are located close to the respective ends of one of two arcuate outline portions, and the remaining holding position (namely, position A) is symmetric to the middle point A" of the straight line connecting between the two holding positions. As shown, position A is somewhat shifted from the horizontal line passing the axis of the lens. Position A may be determined first, and positions B and C may be determined in accordance with the distance for which position A is shifted from the horizontal line passing the axis of the lens.

Figure 6C:
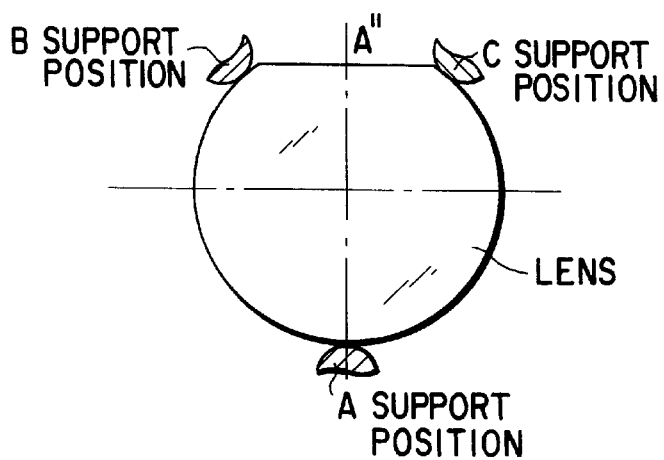

FIG. 6C shows an example of a manner in which a "D"-shaped lens is held. If the "D"-shaped lens is used, with its cutoff section located up, two of the holding positions (namely, positions B and C) are located close to the respective ends of its arcuate outline portion, and the remaining holding position (namely, position A) the middle point A' of that arcuate outline portion.

In the case shown in FIG. 3C, position A may be determined such that it is symmetric to the middle point A" of the straight line connecting between the other two holding positions B and C.

It is desirable that the manner in which the lens is supported at three positions be modified in accordance with the effective dimensions at the time of design, the stability of the lens, and other factors.

In general, the step for cutting off part of a circular lens requires time and labor and is costly. Therefore, the step should be used in consideration of the practical advantage of the space produced by the step.

The manner in which a lens is supported at three positions, including determination of the positions, can be modified in various manners in accordance with the shape of that lens. Accordingly, the shape of the lens frame for holding the lens can be determined in accordance with the modifications.

In general, in the case of a circular lens, the division of the outer diameter relative to the optical axis can be determined with very high accuracy (about $1/100$ to $5/1000$) by the conventional flux method, etc. In the case of a partly-cutoff lens, however, the however, the vertical dimensions, particularly the distance between the optical axis and the cutting line of the lens, cannot be determined with such high accuracy (the accuracy is about one tenth of the above-noted accuracy). In view of this, it can be understand that the partly cutoff lens should be supported at the arcuate outline portions.

(Modification)

In the embodiment described above, an oval lens is referred to as an example of a non-circular lens. Needless to say, a "D"-shaped lens may be used. Like the oval lens, the "D"-shaped lens can be held by supporting it at three or more positions of the arcuate outline portion. The members for holding the "D"-shaped lens may be arranged in the manner shown in FIG. 6C, and this arrangement can be determined in accordance with the location of the cutoff section (which portion of a circular lens is cut off). A "D"-shaped lens can be manufactured at lower cost than that of an oval lens since it can be obtained by cutting off only one portion of a circular lens. The use of a "D"-shaped lens or lenses is preferable for attaining a cost reduction.

In the lens barrel of a camera, a plurality of lenses are supported by means of a lens frame. Each lens can be supported at three positions in the manner described above, but the number of support positions is not limited to three. It can be varied as long as the lens can be held in a stable manner. Each lens can be held at only two support positions if the lens frame has such a shape as immovably holds the lens. This holding structure can be applicable to the case where a lens must be held in a very stable manner by "plane contact" or the like.

(Other Modifications)

In addition to the above, the present invention can be modified in various manners without departing from the spirit of the present invention.

In the above embodiment, reference was made to a case where an oval lens or a "D"-shaped lens is held by means of a lens frame (as a lens holding member). It should be noted that the shape of a lens to be adopted, the process for forming the lens, etc. are not limited to the examples given above. These can be modified freely as long as the modification does not affect the precision required in the manufacture of a camera.

For example, a lens employed in the present invention may be a plastic lens or a resin lens. In other words, the lens holding structure of the present invention is suitable not only for holding a partly-cutoff glass lens (obtained by working a circular glass lens) but also for holding a lens formed by injection molding or the like. In addition, if the lens to be employed has a larger modulus of elasticity and a employed has a larger modulus of elasticity and a larger coefficient of friction, the material of the lens frame can be selected from a larger number of materials.

According to the present invention, it is possible to provide a holding structure which is incorporated in a photographing optical system to hold a non-circular lens having an arcuate outline portion, which can be realized by a simple-structure member (such as a lens frame), and which enables easy assembly and accurate lens holding.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens holding structure comprising:
a holding member for holding a non-circular lens with an arcuate outline portion and a non-arcuate outline portion by supporting the lens at at least three positions of the arcuate outline portion, in a manner such that the non-arcuate outline portion is not touched.

2. The lens holding structure according to claim 1, wherein said non-circular lens is one of a plurality of lenses employed in a photographing optical system.

3. The lens holding structure according to claim 1, wherein said holding member holds said non-circular lens by one of point contact and linear contact with the arcuate outline portion.

4. The lens holding structure according to claim 1, wherein said holding member holds said non-circular lens such that said non-circular lens is immovable in both a radial direction of said non-circular lens and an optical axis direction.

5. The lens holding structure according to claim 1, further comprising:
an adhesive, located between said non-circular lens and said holding member, for bonding said non-circular lens and said holding member together.

6. The lens holding structure according to claim 1, further comprising:
an orientation section for coarsely determining an orientation of said non-circular lens by controlling the non-arcuate outline portion when said non-circular lens is held by said holding member.

7. The lens holding structure according to claim 1, further comprising:
a mask, arranged at a position near the non-arcuate outline portion, for shielding light.

8. The lens holding structure according to claim 1, wherein said non-circular lens is one of a "D"-shaped lens and an oval lens obtained by cutting-off part of a circular lens.

9. A lens holding structure for holding a non-circular lens having a plurality of non-arcuate outline portions, which are obtained by cutting off an outer circumference of a circular lens at positions away from an optical axis of said circular lens by a predetermined distance, and a plurality of arcuate outline portions, which are portions other than the non-arcuate outline portions, said lens holding structure comprising:
a holding member having projections on an inner circumferential surface thereof, the projections being located at two positions near two ends of one of the arcuate outline portions and at a position which is symmetric to a middle point between the two positions and on an arc of the one of the arcuate outline portions including the two positions with reference to the optical axis.

10. The holding structure according to claim 9, wherein said non-circular lens is an oval lens obtained by working a circular lens.

11. A lens holding structure for holding a non-circular lens having a non-arcuate outline portion, which is obtained by cutting off an outer circumference of a circular lens at a position away from the optical axis of the circular lens by a predetermined distance, and an arcuate outline portion, which is a portion other than the non-arcuate outline portion, said lens holding structure comprising:
a holding member having projections on an inner circumferential surface thereof, the projections being located at two positions near two ends of the arcuate outline portion and at a position near a middle point between the two positions and on an arc of the arcuate outline portion.

12. The lens holding structure according to claim 11, wherein said non-circular lens is a "D"-shaped lens obtained by working a circular lens.

13. A photographing optical system for guiding an optical image onto a film, comprising:
a non-circular lens having an arcuate outline portion and a non-arcuate outline portion; and
a holding member for holding said non-circular lens by supporting the arcuate outline portion at at least three positions, in a manner such that the non-arcuate outline portion is not touched.

14. The photographing optical system according to claim 13, wherein said holding member holds said non-circular lens by one of point contact and linear contact with the arcuate outline portion.

15. The photographing optical system according to claim 13, wherein said holding member holds said non-circular lens such that said non-circular lens is immovable in both a radial direction of said lens and an optical axis direction.

16. The photographing optical system according to claim 13, further comprising:
an adhesive, located between said non-circular lens and said holding member, for bonding said non-circular lens and said holding member together.

17. The photographing optical system according to claim 13, further comprising:
an orientation section for coarsely determining an orientation of said non-circular lens by controlling the non-arcuate outline portion when said non-circular lens is held by said holding member.

18. The photographing optical system according to claim 13, further comprising:
a mask, arranged at a position near the non-arcuate outline portion, for shielding light.

19. The photographing optical system according to claim 13, wherein said non-circular lens has a shape which corresponds to an image frame of a silver film and which allows passage of photographing luminous fluxes that are effective with respect to the image frame.

20. The photographing optical system according to claim 13, wherein said non-circular lens is an oval lens obtained by cutting off part of a circular lens along cutting lines away from an optical axis of said lens by a predetermined distance, said cutting lines being parallel to upper and lower sides of an image frame of a silver film.

21. The photographing optical system according to claim 13, wherein said non-circular lens is one of a "D"-shaped lens and an oval lens obtained by cutting off part of a circular lens.

22. A photographing optical system for guiding an optical image onto a film, comprising:
a plurality of non-circular lenses each having a plurality of arcuate outline portions and a plurality of non-arcuate outline portions; and
a holding member for holding at least one of said non-circular lenses at at least three positions, said three positions being two positions located near two ends of one of the arcuate outline portions and one position which is located near a middle point of a one of the arcuate outline portions that is opposite to the one of the arcuate outline portions including the two positions.

23. The photographing optical system according to claim 22, wherein said non-circular lenses held by said holding member include an oval lens obtained by cutting off part of a circular lens.

24. A photographing optical system for guiding an optical image onto a film, comprising:
- a plurality of non-circular lenses each having an arcuate outline portion and a non-arcuate outline portion; and
- a holding member for holding at least one of said non-circular lenses at at least three positions, the three positions being two positions located near two ends of one of the arcuate outline portions and one position which is located near a middle point of the one of the arcuate outline portions including the two positions.

25. The photographing optical system according to claim 24, wherein said non-circular lenses held by said holding member includes a "D"-shaped lens obtained by cutting off part of a circular lens.

26. A photographing optical system for guiding an optical image onto a film, comprising:
- a non-circular lens defined by first and second arcuate outline portions and two substantially parallel linear outline portions; and
- a holding member for holding said non-circular lens at at least three positions, the three positions being two positions located near two ends of the first arcuate outline portion and one position which is located near a middle point of the second arcuate outline portion opposite to the first arcuate outline portion.

* * * * *